United States Patent [19]
Swenson

[11] 3,811,323
[45] May 21, 1974

[54] LIQUID METER
[75] Inventor: George H. Swenson, Medfield, Mass.
[73] Assignee: Hersey Products Inc., Dedham, Mass.
[22] Filed: Sept. 8, 1971
[21] Appl. No.: 178,678

[52] U.S. Cl. .......................................... 73/231 R
[51] Int. Cl. ............................................. G01f 1/10
[58] Field of Search .............................. 73/231 R

[56]  References Cited
UNITED STATES PATENTS
3,371,531   3/1968   Ezekiel et al. ................. 73/231 R
3,182,504   5/1965   Rittenhouse et al. ........... 73/231 R
3,388,595   6/1968   Last et al. ....................... 73/231 R
3,364,743   1/1968   Clinton ............................. 73/231 R FOREIGN PATENTS OR APPLICATIONS
691,780   5/1953   Great Britain ................... 73/231 R Primary Examiner—Charles A. Ruehl
Attorney, Agent, or Firm—William W. Rymer

[57]  ABSTRACT

Liquid flow rate meter of the turbine type in which rotor thrust bearing unloading is achieved by downstream increase of effective flow rate area to produce a Bernoulli's effect upstream force on the rotor.

6 Claims, 3 Drawing Figures

LIQUID METER

This invention relates to metering liquids, and in particular to water meters.

Primary objects of the invention are to improve thrust bearing life and to improve metering accuracy. With respect to the former, objects of the invention are to reduce or even eliminate in preferred embodiments the force between the downstream end of a shaft about which a meter turbine is rotatably mounted, as fluid flow rates rise. With respect to the latter, objects are to extend both the top and bottom of the range of flow rates over which measurement is accurate to within 1 percent; to extend to lower flow rates the range over which measurement is accurate to within 5 percent; to minimize the effect upon accuracy of disturbances in the incoming fluid; and to make possible larger clearance between the meter rotor and the adjacent housing wall, without significantly reducing accuracy. Yet a further object is to make all this possible in a simple, reliable, and very practical device.

The invention features a meter housing with inlet and outlet ends, and a shaft-mounted rotor mounted therebetween, the rotor having a plurality of vanes, each vane comprising an upstream face oriented to receive the impact of fluid entering the housing at the inlet end to cause rotation of the rotor and the shaft about an axis, a downstream face on the side of the vane opposite the upstream face, an inlet end surface, and an outlet end surface.

The invention features, in its reduced thrust bearing wear aspect, providing upstream and downstream thrust bearings for said shaft, the two thrust bearings being spaced apart enough so that the shaft does not simultaneously engage both; and adjusting flow areas adjacent the rotor so that owing to reduced velocity and Bernoulli's equation the downstream face of the rotor is at a higher pressure than the upstream under dynamic conditions, and increasingly so as velocity increases, to reduce or even eliminate force on the downstream thrust bearing as velocity increases, in spite of dynamic thrust in a downstream direction on the vanes and in spite of, for example, magnetic forces tending to draw the shaft against its downstream bearing. In its most preferred embodiment, the invention features further unloading the downstream thrust bearing (including at higher velocities causing movement out of contact therewith) by providing vane inlet end surfaces which slope from the vane downstream face to the vane upstream face to cause, particularly in view of the higher velocity rates at the inlet than outlet of the rotor, the rotor to spin at a rate greater than flow through it would justify, thus creating reverse lift on the rotor in directions generally perpendicular to vane surfaces, and with components in an upstream direction.

The invention features, in its improved accuracy aspect, at least one of the end surfaces sloping from the downstream face to the upstream face and toward the outlet end of the housing, the one surface being at an acute angle to a plane perpendicular to the axis and thereby improving the accuracy of the measurement. In preferred embodiments the vanes are helical; each vane has its inlet and outlet end surfaces sloping as described; each vane has its end surfaces tapered at 10°, and so is narrower at its tip than at its base, thereby improving accuracy; straightening vanes are mounted upstream of the rotor; an inlet hub between an inlet passage and the rotor reduces the cross-sectional flow area to produce a jetting of fluid against the inlet end surfaces; the rotor is supported on the shaft between a longitudinally adjustable jewel thrust bearing and a second jewel thrust bearing mounted between a pair of magnets which couple the rotor shaft to an output member; a pair of shafts respectively carry a worm and a gear meshing with the worm, one shaft being connected to the output member and the other being coupled to the rotor through the magnets, the shafts having longitudinal play to reduce breakaway friction upon meter startup, the shaft carrying the worm being mounted between a pair of jewel thrust bearings, the shaft carrying the gear being mounted with one end adjacent a jewel thrust bearing, and; the end surfaces of each vane make an angle of 22° at the upstream end and 20° at the downstream end with planes perpendicular to the rotor axis where rotor diameter is 3.690 inches, vane thickness is ⅛ inch, vane clearance from the adjacent housing surface is 0.030 inch, and the vanes have minimum and maximum helix angles of 31.5° and 43° respectively (the minimum helix angle preferably being no less than 25°, the maximum no greater than 55°).

Other objects, features, and advantages of the invention will appear from the following description of a preferred embodiment thereof, taken together with the attached drawings thereof, in which.

Figure 1:
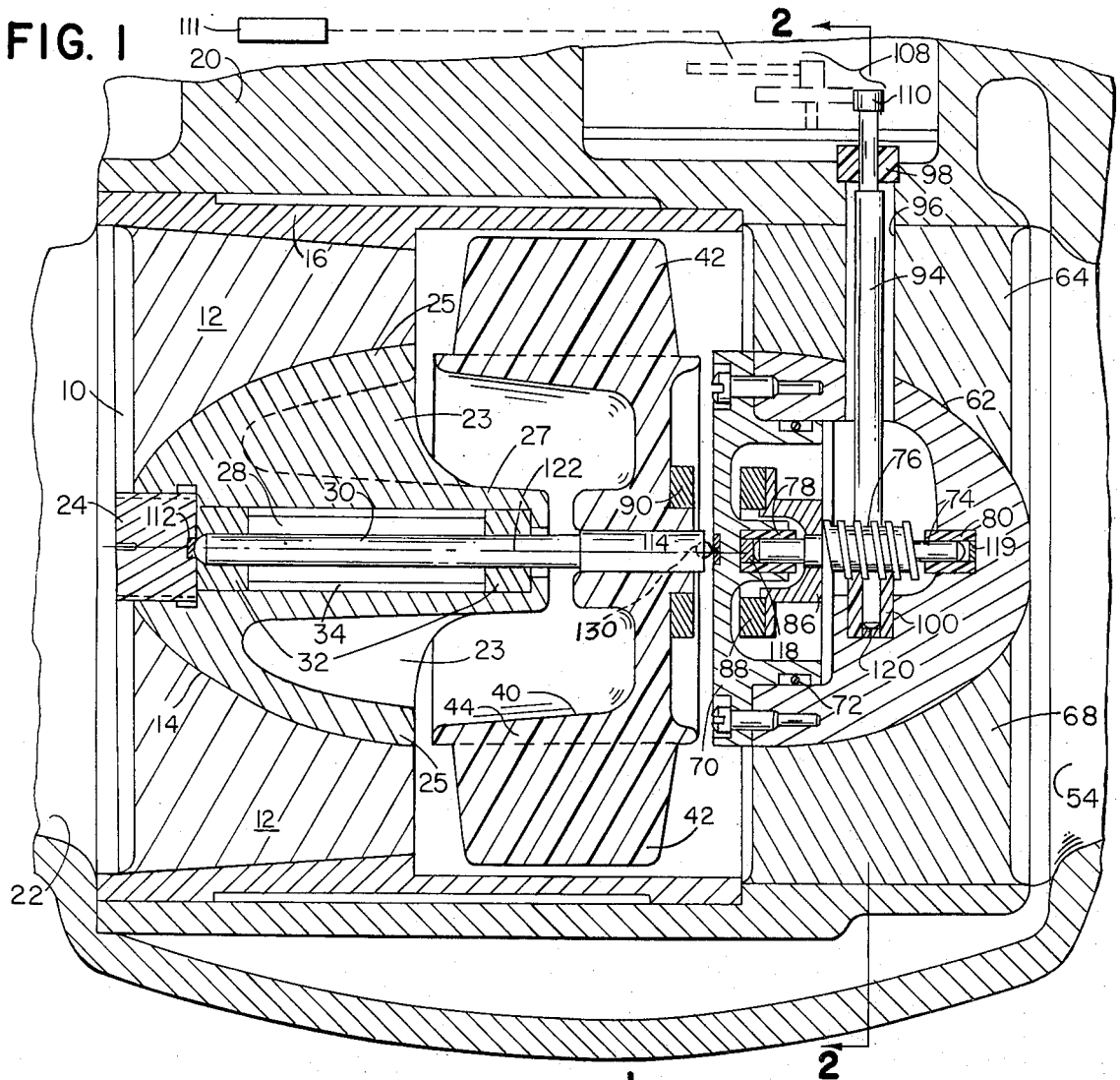
FIG. 1 is a somewhat diagramatic fragmentary sectional view of a meter, taken along 1—1 of FIG. 2.

Referring to the drawings, inlet hub assembly 10 (preferably an integral Noryl—a plastic available from General Electric Company—part, although shown in the drawings as three separate pieces), in which 10 equally spaced radial straightening blades 12 extend from central, somewhat bullet shaped hub 14 to tapered cylindrical shell 16, is mounted in casing 20 downstream of inlet passage 22. Three vanes 23 extend between the outer wall 25 of hub 14 and central portion 27. The net flow area in shell 16 around hub 14 is 80 percent of the net flow area past and around the hub of rotor 40, which is in turn 80 percent of the net flow area past struts 64, 66, 68. Bronze plug 24 is screwed in hub 14 at one end of bore 28 in which stainless steel shaft 30 is rotatably supported by graphite bushings 32 separated by rubber spacer 34.

Figure 3:
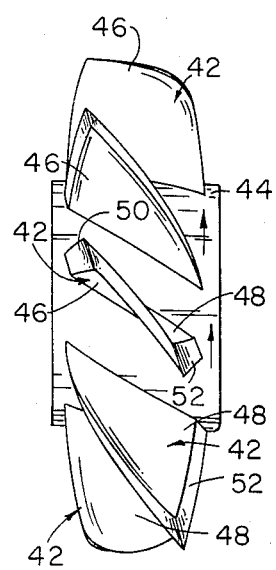
FIG. 3 is an isometric view of the rotor.

Rotor 40 (polypropylene, so that the rotor assembly density is close to that of water), fixed on shaft 30, has nine equally spaced helical vanes 42 extending from a generally cylindrical hub 44. Each vane has an upstream face 46 against which water entering the meter flows to rotate the rotor in the direction of the arrow in FIG. 3, a downstream face 48, an inlet end surface 50, and an outlet end surface 52. End surfaces 50 and 52 slope from face 48 toward face 42 and in the direction of casing outlet passage 54, and in addition each has a 10° taper so that the vanes are narrower at their tips than at their bases adjacent hub 44. Vane thickness is ⅛ inch, and the overall rotor diameter is 3.690 inches. Vane clearance from the inner surface of shell 16 is 0.030 inch. Each vane follows a right handed helix with a lead of 11.853 inches. The helix angle is 31.5° at a diameter of 2.312 inches and 43° at the vane tip (the helix angle preferably ranging from no less than 25° to no greater than 55°).

Figure 2:
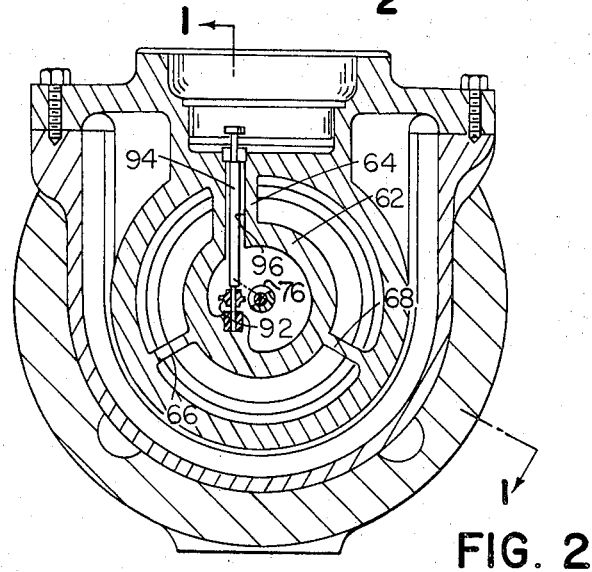
FIG. 2 is a sectional view taken along 2—2 of FIG. 1.

Between outlet passage 54 and rotor 40, outlet hub 62 is preferably integral with (though shown as a separate member in FIG. 1) casing 20 and spaced struts 64, 66, and 68 (FIG. 2). Cap 70 is bolted to hub 62, and sealed thereto by rubber O-ring 72. Steel shaft 74, carrying worm 76, has its ends mounted for rotation in bushings 78 and 80 respectively fixed in cap 70 and hub 62. Bracket 86 (made, integrally with worm 76, of Nylatron GS, available from Polymer Corporation, Polypenco Division, Reading, Pa.) is fixed to shaft 74 and carries ceramic, four-pole magnet 88 which, together with identical magnet 90 mounted on rotor 40, provides magnetic coupling of shafts 30 and 74.

Helical gear 92 (FIG. 2) is fixed on shaft 94, in mesh with worm 76. Shaft 94 extends through bore 96 in strut 64 and casing 20, and is mounted for rotation in bushings 98 and 100 respectively fixed in casing 20 and hub 62.

Output gear train 108, including bronze pinion 110 on shaft 94, transmits the rotation of shaft 94 to a conventional meter register 111.

Synthetic sapphire thrust bearings 112 and 114 are respectively located in plug 24 adjacent shaft 30, and in cap 70 adjacent ball 130, rotation of plug 24 adjusting the clearance of the bearings, which are positioned to provide 1/64 inch longitudinal play in shaft 122. Similar thrust bearings 118, 119, and 120 are in bushings 78, 80, and 100, positioned to allow 0.010 inch of longitudinal play in shaft 74, and 0.014 inch of longitudinal play in shaft 94. Tungsten carbide ball 130 is force-fittedly mounted in a hole at the downstream tip of shaft 122, to engage downstream bearing 114.

In operation, water from inlet passage 22 impinges upon rotor surfaces 46 and 50 to cause rotation of the rotor, and, by virtue of magnets 88 and 90, worm 76, helical gear 92, and shaft 94 are caused to rotate. The longitudinal play in shafts 74 and 94 allows them to bounce upon start-up of the meter, to reduce breakaway friction.

At start-up, attraction between magnets 88 and 90 holds ball 130 of shaft 122 against the bearing 114. As flow increases, a downstream hydrodynamic thrust also increases. Nevertheless, increasing flow has an even greater impact in urging, through the greater pressure against the downstream face of rotor than against the upstream face (owing to Bernoulli's equation, and upstream and downstream rotor areas being equal) the rotor in an upstream direction. Assisting in this is the reverse lift effect already mentioned. Thus, as flow rate increases the force holding the ball 130 against the downstream bearing 114 diminishes and (in the embodiment shown, at a flow rate of about 150 gallons per minute) actually moves away, so that only the upstream bearing 112 is engaged by the shaft, thus providing for lowered and even alternating wear, with consequent greater life and reliability.

At low flow rates (under 30 gallons/minute in the embodiment shown) the increase in the rate of rotation of the rotor (compared with the corresponding rate for vanes with inlet end surfaces perpendicular to the rotor axis 122, FIG. 1) owing to the slope of vane inlet end surfaces 50, improves the accuracy of registration without significantly reducing accuracy at higher flow rates. At higher flow rates the slope of vane outlet end surfaces 52 controls the amount of cavitation present at the outlet end of the rotor, so that the resulting drag on the rotor is not so great as to make the rotor run inaccurately slowly, but remains great enough to prevent over-acceleration of the rotor. In the particular 3 inches rotor embodiment described, registration is most accurate when surfaces 50 and 52 make angles of 22° and 20°, respectively, with planes perpendicular to the rotor axis. Increase or decrease in the slope of surfaces 50 reduces the effectiveness with which those surfaces convert the streaming force of the water into torque about the rotor axis (angles smaller than 22° providing too small a force component transverse to the axis, angles larger than 22° allowing the water to move more easily past surfaces 50). The effectiveness with which surfaces 50 increase rotor speed is improved by the slight jet produced by reduction of flow area from inlet passage 22 to shell 16.

The controlled drag on the rotor provided by surfaces 52 tends to minimize the effect upon rotor speed of disturbances in the water originating upstream of the rotor.

The reduced width of the vanes at their tips decreases fluid shear there at high flow rates, to improve accuracy.

Rotor vanes with variously angled inlet and outlet vane surfaces have been taught (e.g., Zeidler et al. U.S Pat. No. 2,989,004, dated June 20, 1961), as has broadly use of Bernoulli's equation to impose an upstream directional component on a flow meter element including a vaned rotor (Potter U.S. Pat. No. 2,709,366, dated May 31, 1955). However, neither reference teaches the simple, practical, construction and advantages hereinabove disclosed.

Other embodiments will occur to those skilled in the art and are within the following claims.

What is claimed is:

1. A meter for measurement of liquid flow, comprising:
    a housing with inlet and outlet ends, and
    a rotor mounted therebetween,
        said rotor being mounted for rotation on and with a shaft rotatably mounted relative to said housing,
    a downstream thrust bearing for said shaft, and
    an upstream thrust bearing for said shaft,
        the said thrust bearings being spaced apart a distance slightly greater than the length of said shaft,
    the effective net flow area being greater around the hub of said rotor than upstream of said rotor, whereby in consequence of Bernoulli's equation there is diminished loading of said downstream thrust bearing as flow rate increases,
    in which the inlet end surfaces of vanes of said rotor slope from downstream vane faces to upstream vane faces, said slope being at an acute angle to a plane perpendicular to the axis of said shaft, providing reverse lift to enhance the unloading of said downstream thrust bearing and improving accuracy.

2. The meter of claim 1 in which outlet end surfaces of said vanes slope from downstream vane faces to upstream vane faces, said slope being at an acute angle to a plane perpendicular to the axis of said shaft to reduce, but not eliminate, cavitation-created drag on said rotor at high flow rates.

3. The meter of claim 1 in which the effective net flow area just downstream of said rotor is greater than that around the hub of said rotor, further enhancing the upstream force tendency in consequence of Bernoulli's equation.

4. The meter of claim 1 wherein said thrust bearings are jewel thrust bearings, and said shaft is operatively coupled to an output member through a pair of magnets, one of said bearings being between said magnets, and the other of said bearings being adjustable toward and away from said one bearing.

5. The meter of claim 1 further comprising a pair of shafts one of which is operatively connected to an output member, said shafts respectively carrying a worm and a gear meshing with said worm, the other of said shaft being operatively coupled to said rotor through a magnetic coupling, at least one of said shafts being mounted with longitudinal play to reduce breakaway friction upon meter start-up.

6. The meter of claim 5 wherein said shaft carrying said worm is mounted between a pair of jewel thrust bearings, and said shaft carrying said gear is mounted with one end adjacent a jewel thrust bearing, both said shafts having said longitudinal play.

* * * * *